United States Patent [19]
Johnson et al.

[11] Patent Number: 5,898,372
[45] Date of Patent: Apr. 27, 1999

[54] LIGHTED FISHING FLOAT WITH MOTION DETECTOR

[76] Inventors: Randy D. Johnson, 160 W. 3365 S., Salt Lake City, Utah 84115; John F. Johnson, 453 E. 835 N., Orem, Utah 84097

[21] Appl. No.: 09/024,547

[22] Filed: Feb. 17, 1998

[51] Int. Cl.$^6$ ............................................. G08B 23/00
[52] U.S. Cl. ........................... 340/573.2; 340/573.1; 340/691.5; 43/17; 43/17.5
[58] Field of Search ............... 340/573.1, 573.2, 340/573, 555, 691.5, 815.73, 815.74; 43/17, 16, 17.5

[56] References Cited

U.S. PATENT DOCUMENTS

| | | | |
|---|---|---|---|
| 4,291,484 | 9/1981 | Young | 43/17.5 |
| 4,979,153 | 12/1990 | Terry | 367/93 |
| 5,036,615 | 8/1991 | Lu | 43/17.5 |
| 5,052,145 | 10/1991 | Wang | 43/17.5 |
| 5,274,945 | 1/1994 | Ross | 43/17.5 |
| 5,420,567 | 5/1995 | Schwarz | 340/555 |
| 5,615,512 | 4/1997 | Wang | 43/17 |
| 5,758,449 | 6/1998 | Munsterman et al. | 43/17 |

*Primary Examiner*—Daniel J. Wu
*Assistant Examiner*—Anh La
*Attorney, Agent, or Firm*—Delbert R. Phillips

[57] ABSTRACT

An illuminated fishing float with high intensity multi colored high intensity light emitting diodes signals fish activity beneath the float. When the float is activated a single color of light is emitted. When fish activity occurs beneath the float a flashing light is displayed. When a fish takes the bait the flashing light and the single color steady light are extinguished and a steady light of another color is displayed. The float is hollow and is composed of two sections which screw together.

19 Claims, 4 Drawing Sheets

LIGHTED FISHING FLOAT WITH MOTION DETECTOR

BACKGROUND OF INVENTION

1. Field of Invention

Night fishing is difficult and frustrating at best, and for centuries, fishermen have tried many methods and devices designed to make the activity easier and more enjoyable with varying degrees of success.

2. Related Prior Art

The lights utilized in conventional lighted floats are typically small and dim. They are difficult to see, do not clearly indicate the difference between a fish nibbling and a fish hooked, and quickly disappear from sight under water. This severely limits the kind and amount of information relayed to the fisherman.

3. Summary of Invention

The float of this invention has various signal lights to indicate varying conditions. A motion detector in the float activates a flashing light to indicate fish are in the vicinity of the float. A different colored light is illuminated when a fish comes in contact with the hook. The two lights are extinguished leaving a third light of another color illuminating the float. The light sources are very high intensity light-emitting diodes (LEDs). The lights of the float can easily be seen in cloudy and deeper water and at greater distances than other types of illuminated floats. The water beneath the float is illuminated by a light which may attract fish. The lights in the top portion also attract flying insects which may attract fish to the vicinity of the float. The shape of the float is immaterial as long as it is buoyant and the two sections can be fastened together to complete the electrical connections. The bottom section must be shaped so that a light beam can shine below the float. Otherwise the shape of the float may vary for interest and novelty, usually, however the shape will be round or oval. Other shapes may include for instance boat shape, duck shape etc. The batteries which power the LEDs and electronic circuitry can be quickly and easily replaced even in the dark by separating the top and bottom section and popping out the used batteries and replacing them with new batteries.

The illuminated fishing float is composed of a hollow top section and a hollow bottom section. The hollow top section and the hollow bottom section are fastened together with fastening means which may be threading between the sections forming a hollow float. The top section is composed of light conductive material such as clear or translucent plastic or glass. The top section contains a first light source which is a single color and is capable of intermittent flashing. The first light source may be a red flashing light-emitting diode (LED) and a third light source may be an bicolor red and green light-emitting diode (LED). The hollow float contains an electrical power source which is ordinarily a battery such as a lithium hydride, nickel cadmium or any other dry cell type. This power source powers the various LEDs and electronic circuits. The hollow float also contains a second light source and a motion detecting means. The motion detecting means may be a first photo transistor tuned to the wavelength of the second light source. The first photo transistor is connected through an electronic circuit to the first light source. The variation of light intensity causes the electronic circuit to turn on the first light source. The second light source is positioned to form a beam of light through the clear lens. The first photo transistor senses variations in the intensity of the reflected light from the second light source as fish approach the float thereby switching on the first light source.

The hollow float can also contain a third light source capable of emitting a first color and a second color when the top section and the bottom section are fastened together. The first color is preferably red and the second color is preferably green. The first light source and the third light source are connected through an electronic switching means to a hook. The second color is turned on when fish come in contact with the hook. The first color of the third light source is turned off when fish come in contact with the hook and additionally the first light source is also turned off when fish come in contact with the hook. The electronic switching means may be a second photo transistor tuned to the wavelength of the second light source. The second photo transistor is partially shaded from the light of the second light source by a light shading member which is connected to the hook through a pivot point. The movement of the light shading member when a fish comes in contact with the hook exposes the light-sensitive surface of the second photo transistor to the increased light, causing an electrical current to flow from the second photo transistor. This current causes the first color of the third light source to be turned off and the first light source to be turned off leaving the second color of the third light source illuminating the fishing float.

The top section and the bottom section may be joined by water tight threading between the top and the bottom sections and have electrical contacts to complete electrical circuits in the motion detecting means and the switching means when the two sections are screwed together. The contacts are composed of concentric electrical conducting strips of material located adjacent to the bottom opening of the top section. Spring contacts are located adjacent to the top opening of the bottom section. When the top section and the bottom section are screwed together, the electrical conductive strips of material contact the spring contacts completing the circuits thereby activating the motion detector and the switching means.

DETAILED DESCRIPTION OF DRAWINGS

Figure 1:
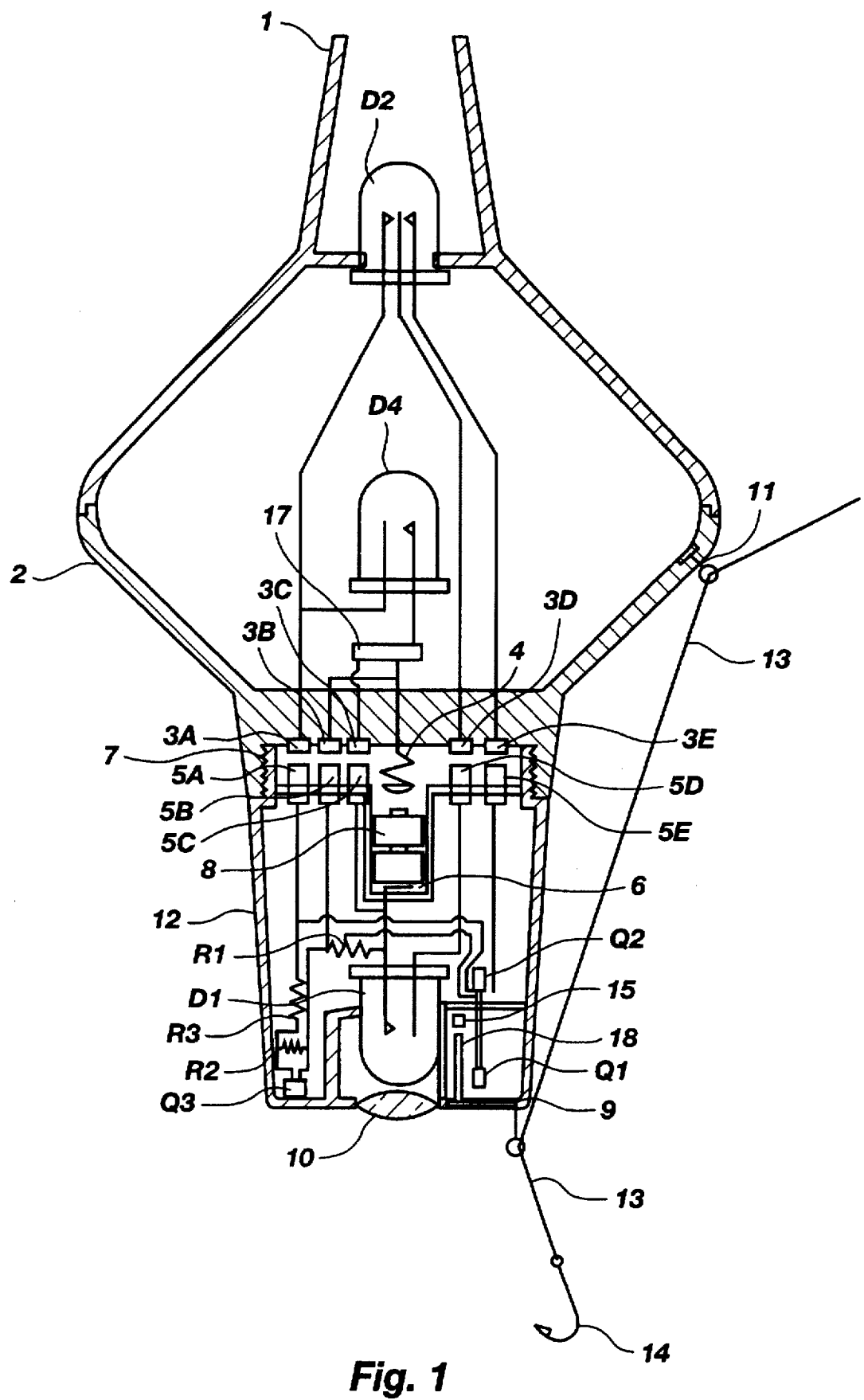
FIG. 1 illustrates a broken section of the side view of the float illustrating the various components in the interior of the hollow float.
Figure 2:
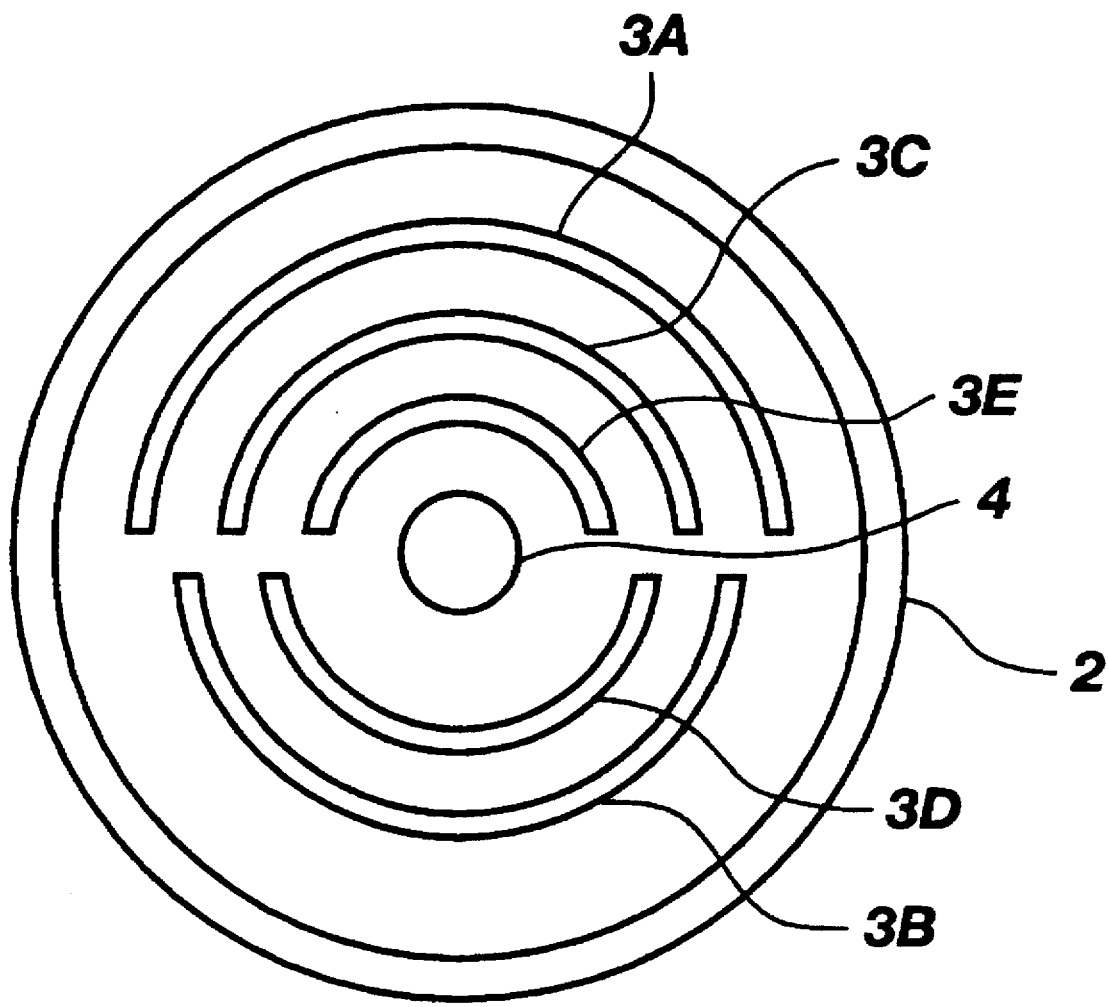
FIG. 2 is a view of the bottom opening of the top section showing the concentric strips of electrical conducting material

The top section of the fishing float consists of an elongated portion 1 which is shaped to support LED D2, and a flared portion 2. Portions 1 and 2 compose the top section of the hollow float and are made from light conductive materials which can be transparent or translucent glass or plastic. Bottom section 12 screws into the bottom opening of section 2 through screw threading 7. This bottom section can be made of plastic or glass but it must have a clear lense 10 and a light conductive spot positioned to allow reflected light to strike the light-sensitive area of Darlington photo transistor Q3. When the top and bottom sections are screwed together, concentric contact strips 3A, 3B, 3C, 3D, 3E, (FIG. 2) make contact with spring contacts 5A, 5B, 5C, 5D, 5E, FIG. 1)

which extend to contact the corresponding concentric strips, respectively. Spring contact 4 extends to make contact with batteries 8 as the bottom section is screwed into the top section. Light-emitting diode D1 lights when this circuit is completed and produces an orange light. Light-emitting diode D1 is positioned to shine down through clear lens 10. When the top and bottom sections are screwed together the circuit is completed which activates the red side of di-colored LED D2.

Figure 3:
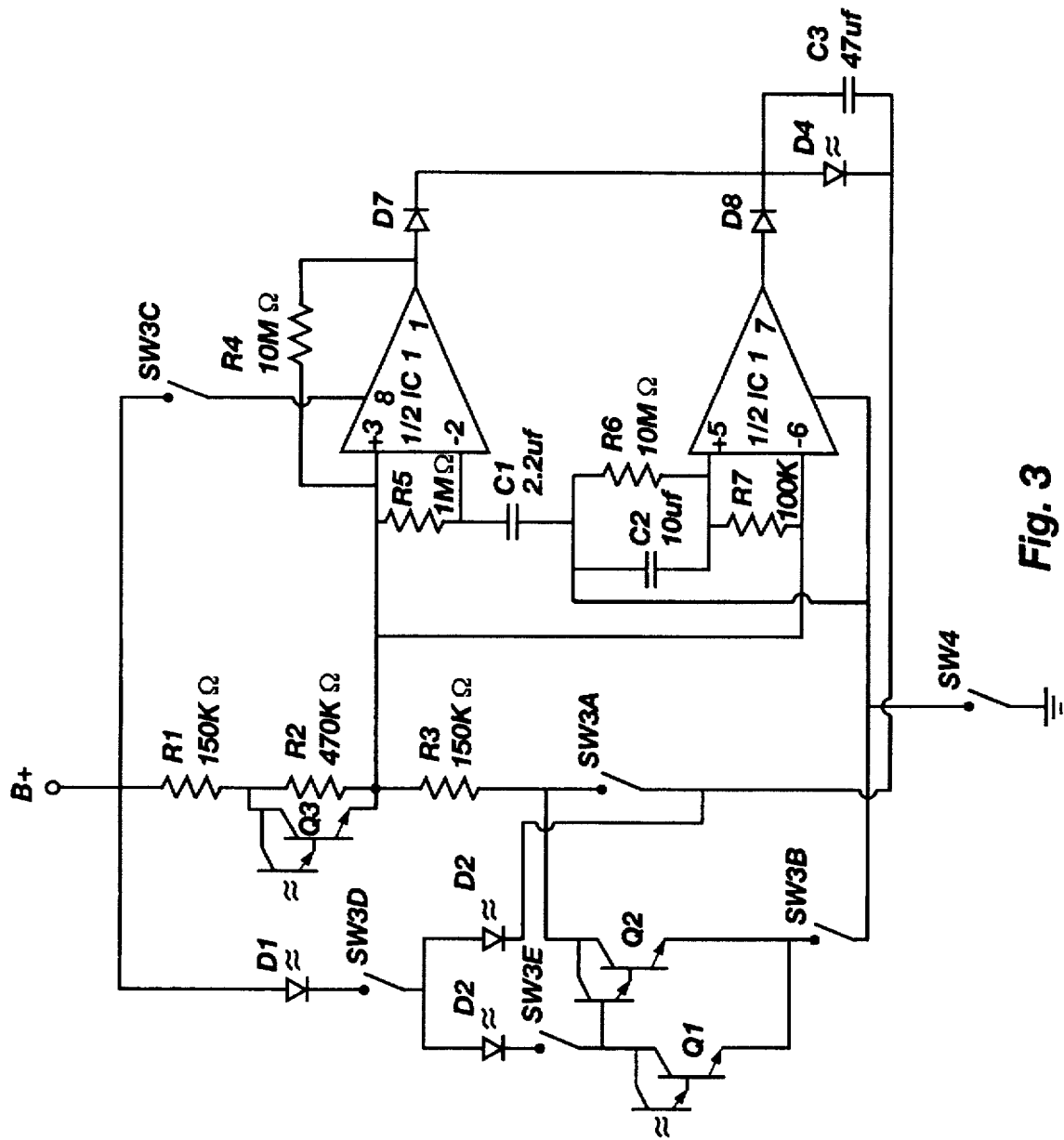
FIG. 3 is a schematic diagram the electrical circuitry for the float.
Figure 4:
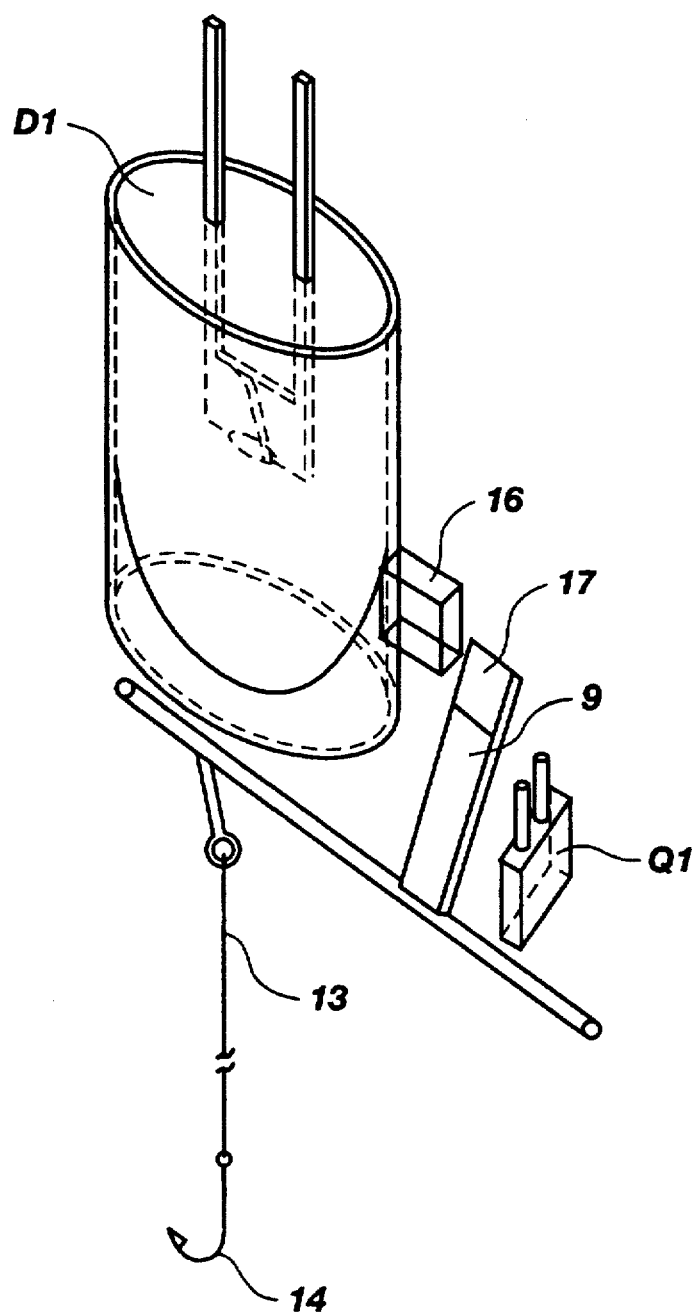
FIG. 4 illustrates, in detail, the switching mechanism associated with the contact of the hook by a fish.
Figure 5:
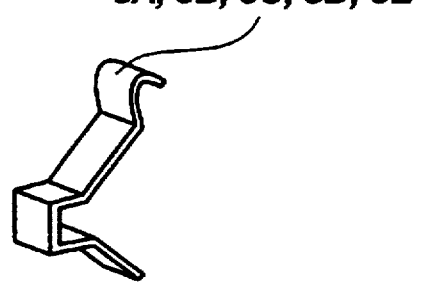
FIG. 5 illustrates the spring contacts which protrude from the top of the bottom section of the float.

Fishing line 13 is anchored to eyelet 11, threaded through the eyelet of light shading member 9, the hook(s) 14, and bait(s) on the end of the line are suspended in the water. If one or more fish move under the float in the area that is illuminated by D1, the light being reflected back up to the float will increase and decrease. This variation of the light will be detected by a Darlington photo transistor Q3, which is tuned to the same wavelength that D1 is transmitting, thus changing the voltage on IC1 pins which are connected to pins 3C and 6. This supplies a positive voltage to capacitor C3, charging this capacitor up and supplying voltage to LED D4, which is a red blinking LED D4. This blinking LED D4 lets the fisherman know that fish are near the hook(s) 14. When a fish takes the bait and increases or decreases the pressure on the light shading member 9 it pivots in response to pressure on the hook(s) 14. This will change the position of the light shading member 9, moving the upper portion of 9 from in front of NPN Darlington Photo Transistor Q1, allowing light from LED D1 to strike the light-sensitive area of the Darlington photo transistor Q1 which will turn Q2 off, and the red portion of the di-colored LED D2 will switch off, and the green portion of LED D2 will be illuminated as indicated in the schematic diagram of FIG. 3. Then at the same time, the blinking LED D4 is switched off because the ground path through NPN Darlington Transistor Q2 is open. At this point, the green light is the only light illuminated in the upper section of the float. Magnet 15 opposes magnet 16, which is attached to the upper portion of the light shading member 9. When the pressure on line 13 is lessened, the magnet returns the light shading member 9 to the position where it blocks light from NPN Darlington Transistor Q1 thus turning the red side of D2 on and activating Darlington photo transistor Q3.

When the float is in active mode and the top and bottom sections are screwed together, the concentric contacts 3A, 3B, 3C, 3D, 3E, are respectively connected with spring contacts, 5A, 5B, 5C, and 5D and spring contact 4 is in contact with the batteries 8. Light shading member 9 is blocking light to NPN Darlington Transistor Q1. LED D1 and the red side of LED D2 and blinking LED D4 will be on because Q2 NPN Darlington Transistor will be supplying a ground path for the circuit.

Circuit board 17 houses capacitors C1, C2, and C3 and IC1 Op Amp, resistors R4, R5, R6, R7, and diode D3 and is connected to contacts 3B, 3C, and spring contact 4.

When a fish bites, light from D1 reaches Q1 because the upper portion of light shading member 9 moves from in front of Q1, turning Q1, on and Q2 off. The green side of LED D2 lights up, and the red side of LED D2 is turned off.

With the float in the water, the light shining down from D1 will be partially reflected back up (because fishing water is not completely clean and clear). This light will be received by the Darlington photo-optic transistor Q3, partially turning it on. This supplies a specific voltage to the inputs of IC1 Op Amp IC (NE4558). This voltage will go through R5 1MΩ and R7 100KΩ, charging C1 2.2 μfd Capacitor and C2 10 μfd Capacitor, which in turn will equalize the voltages on the inputs of IC1 Op Amp IC (NE4558). When this happens, the voltage on the output pins (1 and 7) of IC1 Op Amp IC (NE4558) will become 0 volts. When one or more fish passes through the light below the float, the light being reflected back up to Q3 NPN Darlington Photo Transistor changes. There will be a voltage difference on the inputs of the IC1 Op Amp IC (NE4558), creating a positive output from the IC1 Op Amp IC (NE4558) through diode D7 and diode D8, thus charging C3 and turning D4 on (blinking LED). (Note: R6 is included to stabilize the op amp for a 0 volt output.)

Although the present invention has been described in connection with the preferred embodiment thereof, many other variations and modifications will now become apparent to those skilled in the art without departing from the scope of the invention. It is preferred, therefore, that the present invention not be limited by the specific disclosure herein, but only by the appended claims.

We claim the following:

1. An illuminated fishing float comprising;

a hollow top section and a hollow bottom section;

said top section and said bottom section being secured together with a fastening means;

said top section and said bottom section forming a hollow fishing float;

said top section being composed of light conductive material;

said hollow float containing a first light source;

said first light source is a single color;

said first light source is capable of intermittent flashing;

said hollow float containing an electrical power source, a second light source, and a motion detecting means;

said motion detecting means activating said first light source when fish approach the area surrounding said fishing float.

2. The illuminated fishing float of claim 1 wherein;

said bottom section containing a clear lens;

said second light source being positioned to cast a beam of light through said clear lens;

and said motion detector means being capable of sensing changes in the reflected light from said second light source as fish approach the float thereby switching on the first light source.

3. An illuminated fishing float of claim 2 wherein said hollow fishing float also contains a third light source capable of emitting a first color and a second color;

said third light source: displaying a first color when said top section and said bottom section are fastened together;

said first light source and said third light source being connected to a switching means;

said switching means being activated when pressure is applied to the hook by a fish;

said switching means switches on said second color when fish come in contact with said hook;

said switching means switching off said first color of said third light source when fish come in contact with said hook; and said switching means extinguishing said first light source when fish come in contact with said hook.

4. An illuminated fishing float of claim 1 wherein said first light source is a red flashing light-emitting diode (LED) and a second light source is an amber colored light-emitting diode (LED).

5. An illuminated fishing float of claim 3 wherein said first color is red and said second color is green.

6. An illuminated fishing float of claim 3 wherein said motion detecting means includes;
   a first photo transistor tuned to the wavelength of said second light source;
   said first photo transistor being connected through an electronic circuit to said first light source;
   said first photo transistor being capable of reacting to the variation of the intensity of the reflected light from said fish under said float;
   and said variation in light reflected off of fish under said float causing said electronic circuit to turn on said first light source.

7. An illuminated fishing float of claim 3 wherein said switching means includes;
   a second photo transistor tuned to the wavelength of said second light source;
   said second photo transistor being partially shaded from light emitted from said second light source by a light shading member;
   said light shading member being connected to said hook by a fishing line;
   said light shading member rotates on a pivot point;
   the rotation of said light shading member when a fish exerts a increasing or decreasing pull on said hook exposes light sensitive surface of said second photo transistor causing an electrical current to flow from said second photo transistor;
   said electrical current acting on said switching means causing said first color of said third light source to be turned off and said first light source to be turned off leaving said second color of said third light source illuminating said fishing float.

8. The illuminated fishing float of claim 3 wherein said fastening means is a water tight threading between said top and said bottom sections.

9. The illuminated fishing float of claim 8 having electrical contacts to complete electrical circuits in said motion detecting means and said switching means.

10. An illuminating fishing float of claim 9 wherein said contacts are composed of concentric electrical conducting strips located adjacent to the bottom opening of said top section that engage with spring contacts adjacent to the top opening in said bottom section, when said top section and said bottom section are screwed together, completing a circuit thereby activating said motion detector and said switching means.

11. An illuminated fishing float comprising;
   a hollow top section and a hollow bottom section;
   said top section and said bottom section being secured together with a fastening means;
   said top section and said bottom section forming a hollow fishing float;
   said top section being composed of light conductive material;
   said hollow float containing a first light source;
   said first light source is a single color;
   said first light source is capable of intermittent flashing;
   said hollow float containing an electrical power source, a second light source, and a motion detecting means;
   said motion detecting means activating said first light source when fish approach the area surrounding said fishing float;
   said bottom section containing a clear lens;
   said second light source being positioned to cast a beam of light through said clear lens;
   and said motion detector means being capable of sensing changes in the reflected light from said second light source as fish approach the float thereby switching on the first light source.

12. An illuminated fishing float of claim 11 wherein said hollow fishing float also contains a third light source capable of emitting a first color and a second color;
   said third light source displaying a first color when said top section and said bottom section are fastened together;
   said first light source and said third light source being connected to a switching means;
   said switching means being activated when pressure is applied to the hook by a fish;
   said switching means switches on said second color when fish come in contact with said hook;
   said switching means switching off said first color of said third light source when fish come in contact with said hook; and
   said switching means extinguishing said first light source when fish come in contact with said hook.

13. An illuminated fishing float of claim 11 wherein said first light source is a red flashing light-emitting diode (LED) and a second light source is an amber colored light-emitting diode (LED).

14. An illuminated fishing float of claim 13 wherein said first color is red and said second color is green.

15. An illuminated fishing float of claim 13 wherein said motion detecting means includes;
   a first photo transistor tuned to the wavelength of said second light source;
   said first photo transistor being connected through an electronic circuit to said first light source;
   said first photo transistor being capable of reacting to the variation of the intensity of the reflected light from said fish under said float;
   and said variation in light reflected off of fish under said float causing said electronic circuit to turn on said first light source.

16. An illuminated fishing float of claim 12 wherein said switching means includes;
   a second photo transistor tuned to the wavelength of said second light source;
   said second photo transistor being partially shaded from light emitted from said second light source by a light shading member;
   said light shading member being connected to said hook by a fishing line;
   said light shading member rotates on a pivot point;
   the rotation of said light shading member when a fish exerts a increasing or decreasing pull on said hook exposes light sensitive surface of said second photo transistor causing an electrical current to flow from said second photo transistor;
   said electrical current acting on said switching means causing said first color of said third light source to be turned off and said first light source to be turned off leaving said second color of said third light source illuminating said fishing float.

17. The illuminated fishing float of claim 11 wherein said fastening means is a water tight threading between said top and said bottom sections.

18. The illuminated fishing float of claim 16 having electrical contacts to complete electrical circuits in said motion detecting means and said switching means.

19. An illuminating fishing float of claim 18 wherein said contacts are composed of concentric electrical conducting strips located adjacent to the bottom opening of said top section that engage with spring contacts adjacent to the top opening in said bottom section, when said top section and said bottom section are screwed together completing a circuit thereby activating said motion detector and said switching means.

* * * * *